Nov. 10, 1959  L. G. FISCHER  2,912,692
SECTOR-SCANNING DIRECTION-FINDER SYSTEMS
Filed Feb. 1, 1957  3 Sheets-Sheet 2
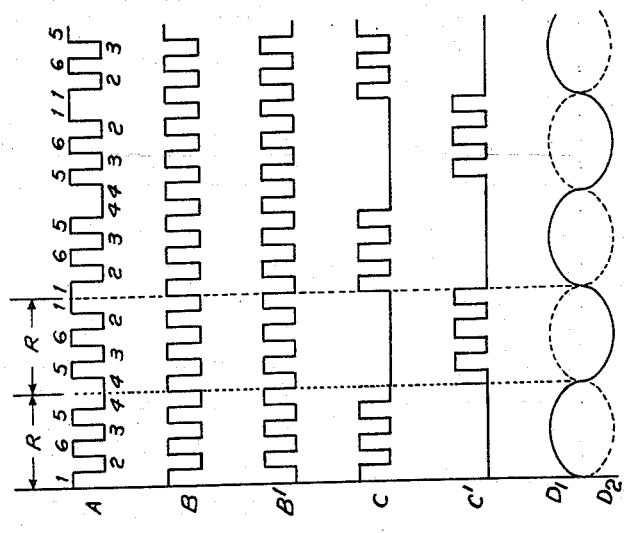
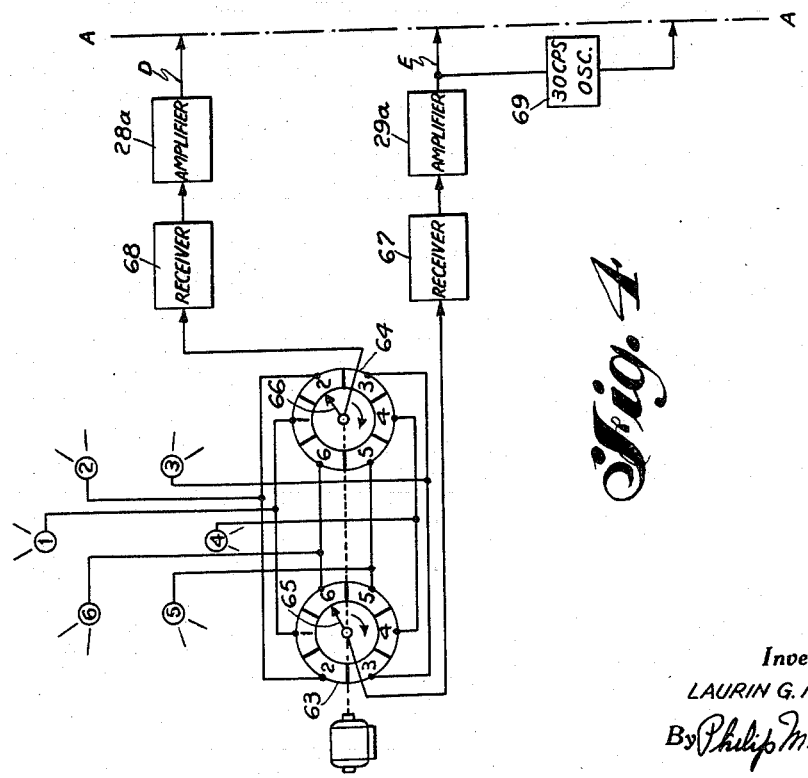
Inventor
LAURIN G. FISCHER
By Philip M. Bolton
Attorney

United States Patent Office 2,912,692
Patented Nov. 10, 1959

2,912,692

SECTOR-SCANNING DIRECTION-FINDER SYSTEMS

Laurin G. Fischer, Glen Rock, N.J., assignor to International Telephone and Telegraph Corporation, Nutley, N.J., a corporation of Maryland Application February 1, 1957, Serial No. 637,654

12 Claims. (Cl. 343—120)

This invention relates to sector-scanning direction finders.

In sector-scanning direction finders, directional antennas are directed over different azimuthal sectors. The signal output of the antenna or antennas directed to the sector or sectors from which an incoming signal is being received is of maximum amplitude, while that of the antennas directed towards other sectors is of lesser amplitude output or none at all. Thus, by comparing the relative amplitudes of the signals from the different antennas, an indication of the direction of the signal source can be obtained.

To minimize the amount of equipment required for the above operations, in certain sector-scanning direction finders the antenna outputs are sequentially scanned by means of a rotary switch each of whose successive stationary contacts is connected to a corresponding antenna so that the rotary brush, in effect, sequentially and cyclically scans the different azimuthal sectors of the horizon. Since the output of the brush is a maximum when touching the contacts coupled to the antennas generally directed towards the signal source and since the amplitude of the brush output will decline as the brush is connected to those antennas directed further away from said signal source, the output of the brush will therefore be in the form of a complex wave having as its components the incoming signal frequency, on which has been superimposed a modulation envelope waveform (referred to hereinafter as a modulation wave) produced by the switch rotation, which modulation wave has a frequency equal to the frequency of rotation of the brush and a phase which varies according to the azimuthal direction from which the signal is being received. Since it is the phase of this modulation wave which provides the direction-indicating information, one way of obtaining a directional indication is to compare the phase of this modulation wave with that of a reference wave of the same frequency. The phase of the reference wave is fixed with respect to the rotation of the brush so that, for example, when the brush is connected to the antenna whose directional pattern is north, the reference wave is at its maximum.

This phase comparison can be made on a phase meter which is suitably calibrated, and the reading obtained can give the true compass bearing of the signal source as well as the relative bearing thereof with respect to the direction finder.

In certain cases, however, the direction finder and its associated antennas may not be properly oriented with respect to compass directions, or this orientation may change as, for example, when the direction-finder system is mounted on a ship. In such cases, while the reference wave still remains phase locked to the rotation of the switch brush, the reading obtained no longer gives the true compass direction; and adjustment must be made for the change of orientation of the ship. Furthermore, it is often desirable to have the information as to the bearing of the signal source available at different points on the ship. A system has heretofore been proposed which is adapted to derive data as to the relative bearing of a signal source from the phase of the modulation wave at the output of the brush and to utilize compass information from the ship's gyro compass to convert this into a true compass bearing indication. This compass bearing is then repeated to various parts of the ship using synchros.

Such systems tend to be relatively complex and require a considerable amount of apparatus. One of the major reasons for the complexity of such systems is that while the gyro compass provides signals of fixed time phase but variable amplitude adapted to drive synchros and while synchros are most suitable for repeating the compass information, the bearing data modulation wave provides its information in the form of time phase varying information.

An object of the present invention is the provision of an improved sector-scanning direction-finder system of the type using synchro driven indicators.

Another object of the present invention is the provision of a direction finder of the above-mentioned type in which relative bearing indications are converted into true compass indications.

A further object of the present invention is the provision of an improved direction finder of the sector-scanning type in which the reference wave is obtained from the sector-scanning switch and is thereby locked in phase to the positions of the switch arm.

A feature of the present invention is the conversion of variable phase information from a sector switch by simple circuit means into a plurality of signals of fixed phase which are suitable for driving a synchro, this being accomplished without the use of synchro or servo-mechanism means.

Other and further objects of the present invention will become apparent, and the foregoing will be better understood with reference to the following description of embodiments thereof, reference being had to the drawings, in which:

Fig. 2 is a series of graphs explanatory of the operation of Fig. 1;

Fig. 4 is a schematic and block diagram of a modification of the portion of the system of Fig. 1 to the left of the line A—A.

Figure 1:
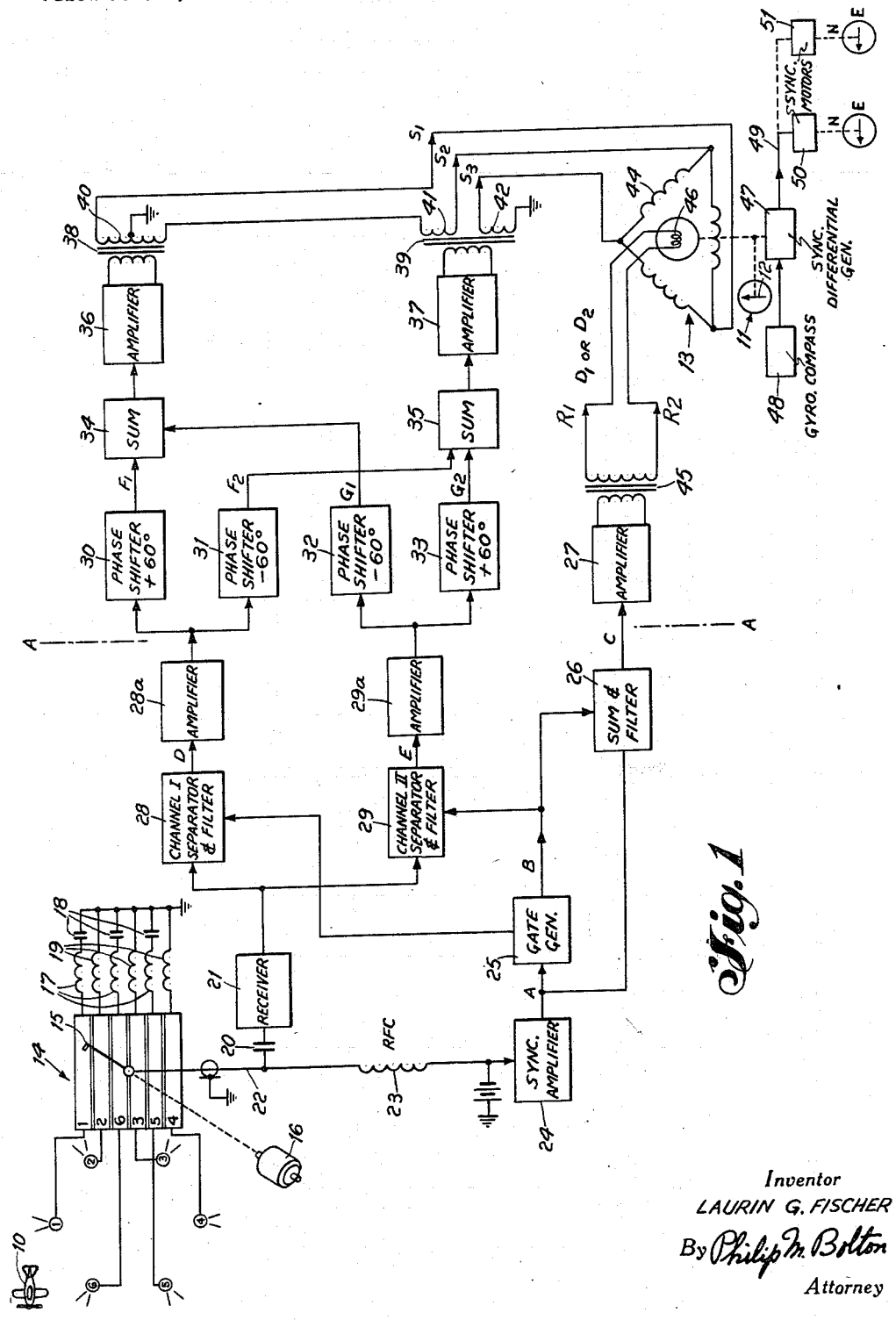
Fig. 1 is a schematic and block diagram of a direction-finder system according to the invention.

In accordance with the first-mentioned feature of the present invention, the antennas' outputs are scanned not only in one direction (for example, clockwise) but are also simultaneously scanned in the opposite direction (counterclockwise). From each of these scannings, a separate modulation wave is derived whose phase depends on the direction from which the incoming signal is being received. These two waves may be represented by two conjugate vectors rotating in opposite directions at the same frequency. From these two variable-phase waves are derived three signals, each of fixed phase, suitable for driving a synchro. To properly drive the synchro, three signals are required each of the same time phase with respect to the phase of the reference wave. Throughout this specification and claims, except where the context specifically indicates otherwise, a signal is considered of the same phase or time phase as a reference even if in one sense the signal could be taken as 180 degrees out of phase, since this is merely the negative aspect of a wave exactly in phase. These signals should vary in amplitude respectively as the sine or cosine of the angle between the direction from which the incoming signal is being received and a reference direction determined by the phase of the reference wave, the sine or cosine of said angle plus 120 degrees, and the sine or cosine of said angle minus 120 degrees. These signals may be derived from the two modulation waves as follows. The first signal may be obtained by advancing the phase of one of said two modulation waves by 60 degrees and retarding the other by 60 degrees and combining the results. The second signal may be obtained by retarding the phase of said one of said two modulation waves by 60 degrees and by advancing said other by 60 degrees and combining the results. The third signal may be obtained by either additional phase shifting of the two modulation waves (plus and minus 120 degrees each), or by adding the negative of said first signal to the negative of said second signal.

These three signals of constant phase but varying amplitude are then applied to the three inputs of the stator of a synchro motor, the reference wave being coupled to the rotor thereof. The position assumed by the rotor shaft will therefore vary in accordance with the direction from which the incoming signal is being received. By coupling the rotor shaft to the rotor of a synchro differential and applying the gyro compass information to the stator thereof (the gyro compass information being available in the form of three proper signals), the output of this synchro differential will then provide suitable, true compass information to drive one or more synchro indicators.

It is to be noted that the gyro compass system is isolated from the direction-finding system; that is, they do not necessarily have the same reference frequency source and do not have to be of the same frequency. This results in a further simplification of the systems required.

In accordance with the second-mentioned feature of the present invention in which the reference wave is derived from the sector switch, the sector switch has a D.-C. source connected to alternate contacts thereof to provide an output from which the reference wave is derived.

In deriving the two modulation waves, it is possible to use two sector switches and two receivers as shown in Fig. 4. However, it is preferred to mix the two scans on a time-sharing basis using one sector switch and then to separate the outputs after demodulation. This saves a receiver and obviates the need for matching the gains of the two receivers. This system using one receiver will now be described in connection with Fig. 1.

Referring to Fig. 1, there is represented by the numeral 10 any target or source whose direction is to be indicated on a suitable bearing indicator, such, for example, as a meter 11. In accordance with the invention, the meter 11, having a bearing indicator pointer 12, has the pointer shaft connected to the shaft of a conventional synchro 13. The meter 11 can be mounted at any convenient point on a vessel or at any other location at which the bearing of target 10 is to be indicated. Associated with the meter 11 is a novel sector switch arrangement 14 and radio receiver and vector conversion circuits according to the invention. Suitably mounted on the vessel or other observation point are a series of six directionally sensitive antennas as shown in Fig. 1 and designated 1 to 6, each directed to cover approximately a separate 60-degree sector. Each antenna may be of any well-known directionally sensitive kind, for example so-called horn antennas, loop antennas, and the like. If desired, each antenna may be formed of a combination of two or more omnidirectional antenna units whose phase difference with respect to an arriving wave from target 10 can, by any well-known means, be converted to a corresponding signal voltage vector whose vector angle and amplitude represent the sampled bearing of the target 10 by each of the antennas.

Each of the antennas 1 to 6 is connected to the correspondingly numbered bar of the sector switch 14. In a system using six sensing antennas, switch 14 is provided with a series of six spaced stationary parallel conductor bars and with a rotary wiper 15 rotated at a predetermined fixed rate, for example, 1,800 r.p.m. (30 c.p.s.), by a suitable motor 16. The width of the conductor bars is proportioned so that the rotary wiper dwells the same length of time on each bar except the top and bottom bars where the dwell time is twice that on each of the other contacts. The bars are so arranged that the R.-F. impedence of each bar is equal to that of any other and will present the correct impedance to the input transmission lines. Furthermore, in order to provide a reference wave and switching D.-C. voltage, the bars are so connected that alternate bars are connected to ground for direct current while the direct-current conductance for the other bars is maintained above ground. Thus, alternate bars, for example, bars 1, 6, 5, are connected to ground through respective high-impedance radio-frequency impedances 17, but direct current is blocked by series capacitors 18. The intervening alternate bars 2, 3, 4 are galvanically connected to ground, each through a respective radio-frequency high impedance 19. By such an arrangement, all the bars are unloaded with respect to R.-F. impedance, while for direct current the bars 2, 3, 4 have a low impedance to ground while the bars 1, 6, 5 have a high impedance to ground.

The wiper 15 is coupled by a suitable coupling condenser 20 to the input of a suitable conventional radio receiver 21 over a single coaxial cable 22. The input to the receiver consists of a complex wave having as its components the signal received from the source 10 and an envelope thereon produced by reason of the rotation of the wiper 15 during which it cyclically contacts the switch bars which are connected to antennas generally directed towards the source and others further away from the source. In the receiver the signal frequencies are eliminated in a conventional manner and the output is the envelope. This envelope will have an irregular shape due to the irregular arrangement of the sequence of bars in switch 14. It will be noted that the bars, reading from top to bottom, are arranged in the order 1, 2, 6, 3, 5, 4. The reason for this will be seen when considering how this envelope, appearing at the output of receiver 21, is treated thereafter.

The output of the receiver 21 is separated on a time-sharing basis in two channels, designated hereinafter as channel 1 and channel 2, respectively, by means of gating voltages derived from the operation of sector switch 14. To provide these gating voltages, wiper 15 is galvanically connected via line 22 and through a radio-frequency choke 23 to a synchronizing signal amplifier 24. By means of a D.-C. voltage source in amplifier 24 (shown in the circuit diagram of Fig. 3), a D.-C. voltage wave, illustrated in Fig. 2, curve A, is produced due to the rotation of wiper arm 15. This wave is impressed on a gate generator 25, which may be, for example, in the form of a free-running multivibrator, to synchronize this multivibrator. The output of the gate generator 25 will be either in the form shown in curve B or curve B' of Fig. 2. To produce a suitable reference wave, the output of sync amplifier 24 and the output of gate generator 25 are combined in a sum and filter circuit 26, the combining of the two waves A and B or B' of Fig. 2 resulting in the wave C or C' and the filtering thereof producing one of two reference waves $D_1$ or $D_2$ which are then suitably amplified in an amplifier 27 and used as the reference for driving the synchro motor 13. As will be explained hereinafter whether the gate generator produces wave B or B' resulting in waves C or C' and reference waves D or D' at $R_1$—$R_2$ respectively will make no difference in the operation of the system.

As can be seen from Fig. 2, a zero or crossover point for reference wave $D_1$ and $D_2$ at $R_1$—$R_2$ occurs when the sector wiper is at the middle of the top bar 1 and again at the middle of the bottom bar 4. These crossover poins are half a wavelength apart (at wiper frequency), and thus for each complete revolution of the wiper arm there is produced a complete cycle of the reference wave $D_1$ and $D_2$ whose phase is fixed to the rotation of the wiper arm.

As stated hereinbefore two modulation waves each of whose phase represents information as to the direction of the source from the direction finder are derived from the output of sector switch 14 and receiver 21, one in channel 1 and the other in channel 2. This is accomplished by applying the gate generating voltages from gate generator 25 (curve B or B' of Fig. 2) to alternately unblock channel separators and filters 28 and 29 in channels 1 and 2, respectively, whose inputs are coupled to the output of receiver 21. Examining the sector switch 14 and remembering that the wiper 15 dwells twice as long on the top and bottom bars 1 and 4, respectively, and on the other contacts for an equal period of time, it will be seen that the wiper 15 when rotating in a clockwise direction beginning from the moment it first touches bar 1 dwells for an equal period on the bars or contacts in the following sequence: 1, 1, 2, 6, 3, 5, 4, 4, 5, 3, 6, 2. The gating voltages from generator 25 alternately enable channel separators 28 and 29 for each successive period so that the output of wiper 15 passing through channel 1 is derived from the bars in the following sequence: 1, 2, 3, 4, 5, 6, while in channel 2 the sequence is 1, 6, 5, 4, 3, 2. These sequences are, of course, cyclically repeated each time the wiper makes a complete rotation. The result is that at the outputs of channel separator 28 and channel separator 29 different modulation envelope waves are found which correspond to opposite directions of scanning, and such waves may be represented by vectors rotating in opposite directions. The filters serve to eliminate the switching frequencies from the output of channel separators 28 and 29. It will be seen that if the wiper rotates at 30 cycles per second and since the wiper dwells on the bars for twelve equal periods during a revolution, the gate generator should supply a gating frequency of 180 cycles per second, with channel 1 being on during one half of each cycle and channel 2 being on during the other half of each cycle. This is accomplished by the aforedescribed arrangement of having alternate segments connected to ground to provide the sync wave of curve A, Fig. 2, having the gate generator 25 free-running at approximately 180 c.p.s.

Since channel 1 would in effect scan the sectors, for example, clockwise while channel 2 would scan the sectors counterclockwise, the resultant waves at points D and E may be represented by two oppositely rotating conjugate vectors which when vectorially combined produce a resultant, fixed in time phase with the reference wave.

To synthesize the three synchro signals $S_1$, $S_2$ and $S_3$ required to properly drive the synchro motor 13, each of the waves in the two channels is amplified in a respective amplifier 28a, 29a and is then applied to a series of phase shifters 30—33. Shifter 33 shifts the phase of the signal from channel 1 by +60 degrees while shifter 31 shifts the phase of the signal from channel 1 by —60 degrees. Likewise the shifter 33 shifts the phase of the signal from channel 2 by +60 degrees while shifter 32 shifts the phase of the signal from channel 2 by —60 degrees. By means of a suitable vector summing network 34, the voltages at points $F_1$ and $G_1$ are vectorially added. Likewise the voltages at points $F_2$ and $G_2$ are vectorially added in summing network 35. These vectorially added voltages are amplified in respective amplifiers 36, 37 and are applied to the synchro terminals $S_1$ and $S_3$ by means of transformers 38 and 39. To derive $S_2$, which is equal to the sum of $-S_1$ and $-S_3$, transformer 38 is provided with a grounded center-tapped secondary winding 40, whose upper end provides synchro voltage $S_1$ and whose lower end is connected in series with one secondary winding 41 of transformer 39 which provides synchro voltage $S_2$. The other secondary winding 42 of transformer 39 at one end provides synchro voltage $S_3$ and the other end is grounded. It will readily be seen that the voltage at the lower end of secondary 40 of transformer 38 is $-S_1$. It will likewise be seen that the voltage induced in the secondary 41 of transformer 39 will be $-S_3$ at the lower end thereof. Thus, $-S_1$ and $-S_3$ are added to produce $S_2$. The synthesis of $S_1$, $S_2$ and $S_3$ by the foregoing apparatus will become clear from the following analysis. If the reference time phase is taken when the brush is centered on sector 1, then the signal at point C and hence $R_1$—$R_2$ is $V_R \sin \omega t$. The signal at D will be $V_1 \sin (\omega t + \theta)$ and at E will be $V_1 \sin (\omega t - \theta)$ where $\theta$ is the bearing angle of a target. Through 60° phase shifting networks, as shown, the signals at $F_1$ and $F_2$ will be $V_1 \sin (\omega t + \theta + 60°)$ and $V_1 \sin (\omega t + \theta - 60°)$. At $G_1$ and $G_2$ these will be $V_1 \sin (\omega t - \theta - 60°)$ and $V_1 \sin (\omega t - \theta + 60°)$. Summing $F_1$ and $G_1$ gives $$2V_1 \cos (\theta + 60°) \sin \omega t$$

while $F_2$ plus $G_2$ gives $2V_1 \cos (\theta - 60°) \sin \omega t$. These are respectively $S_1$ and $S_3$. Through use of split secondary output transformers, $S_2$ is derived as the sum of $-S_1$ and $-S_3$, as shown in Fig. 1. Thus, the necessary voltages have been generated for operating a standard synchro indicator (such as the Navy type IF):

$$R_1 - R_2 = V_R \sin \omega t$$
$$S_1 = V_1 \cos (\theta + 60°) \sin \omega t$$
$$S_2 = V_1 \cos (\theta + \pi) \sin \omega t$$
$$S_3 = V_1 \cos (\theta - 60°) \sin \omega t$$

When rotating the sector switch at 1,800 r.p.m., $\omega$ is $2\pi(30$ c.p.s.$)$. $\theta$ is the relative azimuth angle of the target, and now appears as an amplitude modulation factor.

The voltages $S_1$, $S_2$ and $S_3$ are applied to the three terminals of the stator windings 44 of the synchro motor 13. The reference wave from amplifier 27 is applied through a suitable transformer 45 to the rotor 46 of synchro motor 13. The shaft of the motor may be coupled to a synchro differential generator 47 to which information from the gyro compass 48 is fed by the usual lines provided on a ship, the output of the synchro differential generator then being applied over a line 49 to operate a plurality of synchros 50 and 51 etc. driving suitable indicators.

It has been heretofore stated that the operation of the system is not affected whether the gate generator locks on either phase of wave A to produce gating wave B' instead of B. The only result of this will be to substitute the outputs of channel 1 for that of channel 2 and vice versa. This would also result in a reversal of the phase of the synchro signals $S_1$, $S_2$ and $S_3$. However, the phase of the reference wave would also be reversed ($D_2$ instead of $D_1$) and the operation of synchro motor 13 would be unchanged.

Figure 3:
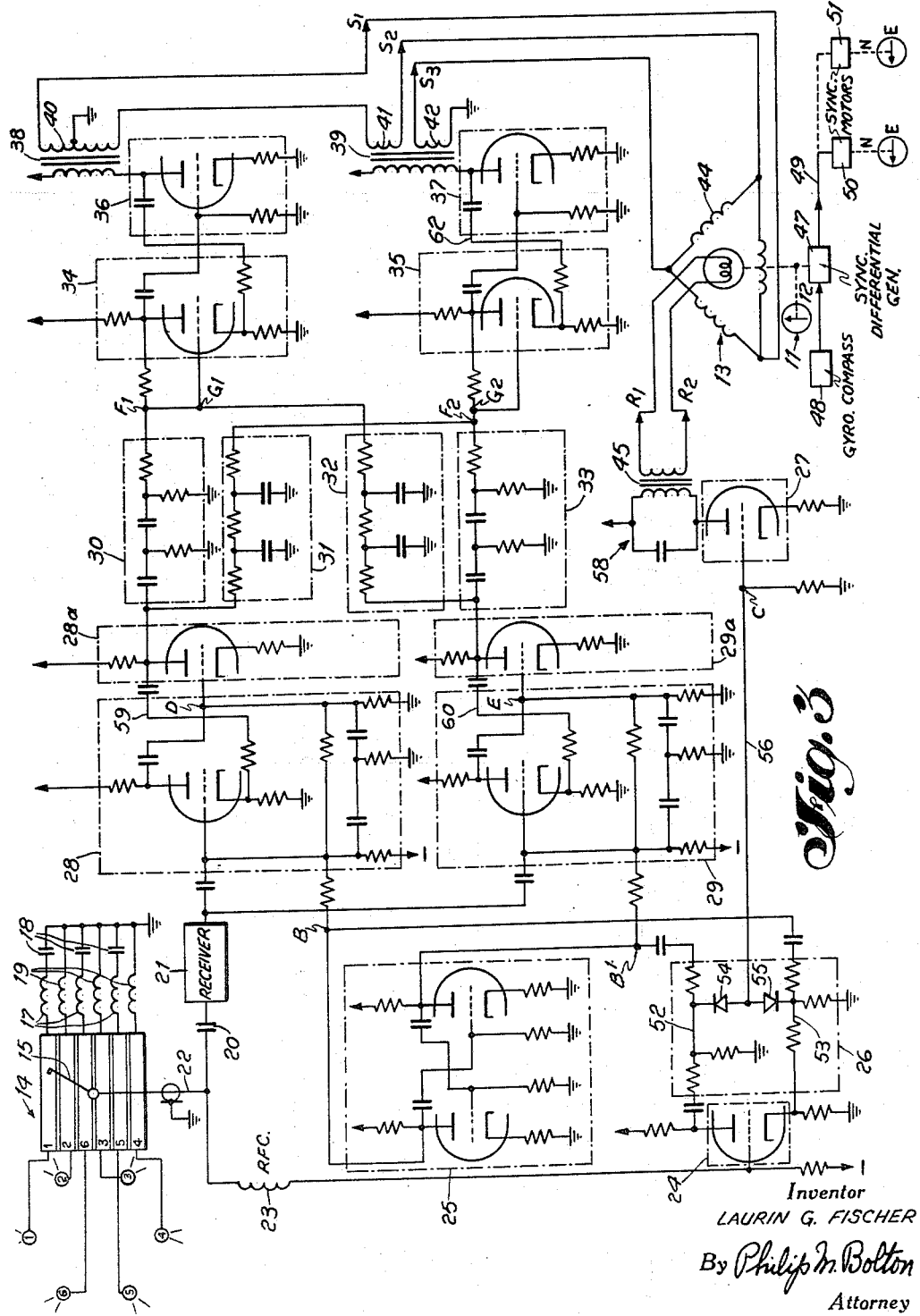
Fig. 3 is a more detailed wiring diagram of the system shown in block form in Fig. 1.

For some further details of the circuitry of Fig. 1, reference is had to the schematic diagram of Fig. 3 in which the same designations are applied to the same part. It will be seen that sector switch 14 is coupled through the radio-frequency choke to a source of negative D.-C. voltage whose positive direct current (not shown) is grounded. It is also coupled to the grid of a tube in sync amplifier 24 which operates as a phase-splitting tube with two output lines 52 and 53, respectively. These lines 52 and 53 are coupled to opposite sides of the gate generator 25 which is a balanced free-running multivibrator to synchronize the multivibrator. Lines 52 and 53 also couple back the multivibrator output across back-to-back rectifiers 54 and 55, at the midpoint of which is found the sum of the outputs of amplifier 24 and the outputs from the multivibrator gate generator 25 (waves A+B or B', Fig. 2), the various R.-C. circuits adjacent the back-to-back diodes serving as coupling and balancing elements. The midpoint of the back-to-back diodes 54 and 55 is coupled over line 56 to the amplifier 27 which has a resonant circuit 58 in the anode circuit thereof broadly tuned to the reference wave frequency and producing the reference wave, which wave is then coupled via the transformer 45 to the rotor coil 46 of the synchro drive motor 13. Lines 52 and 53 are also connected to channel separators 28 and 29, respectively, which each comprise a tube to the grid of which the gating voltage and the output of the receiver 21 are simultaneously applied. The amplifiers 28a and 29a following channel separators 28 and 29 are provided with negative feedback lines 59 and 60, respectively, which stabilize the amplifiers and channel separators and minimize undesirable phase shifting. The phase shifters 33 also serve as filters and help in eliminating the components due to the switching voltages. Negative feedback is also used in lines 61 and 62 from amplifiers 36 and 37, respectively, to the sum circuits 34 and 35.

While in the foregoing it has been assumed that the antennas are arranged so as to be directionally sensitive in one azimuthal region, for example, in a horizontal arc, it will be obvious that by adding additional antennas directionally sensitive in a different region, for example, vertically above the antennas illustrated in Fig. 1, scanning and direction finding may be achieved in three dimensional space. It will also be understood that the circuits and apparatus for deriving the modulation waves, the synchro voltages and reference wave above mentioned from the received signals are not necessarily limited for use in combination with the novel sector switch shown. For example, the conjugate vectors and reference voltage can be controlled by two conventional sector switches effectively scanning in opposite directions to produce the necessary voltages found at the outputs of the channel separator as shown in Fig. 4.

Referring to Fig. 4, the antennas 1 through 6 are coupled to corresponding contacts of two sector switches 63 and 64, respectively, with the wiper arms 65 and 66, respectively, of the switches being driven in the same direction, but with their contacts oppositely arranged to produce oppositely rotating scans. The wipers 65 and 66 are coupled to separate receivers 67 and 68 whose output is then fed to amplifiers 28a and 29a, respectively. Since no gating operation is necessary, the reference wave can be obtained from a 30 c.p.s. oscillator 69 which is synchronized with the output of one of the amplifiers, for example, 29a. The rest of this system is the same as hereinbefore described in connection with Figs. 1 and 2.

While the invention has been illustrated and described in connection with a set of six directionally sensitive antennas, a greater or lesser number but more than two may be employed with a corresponding number of sector switch bars. Other possible changes will be obvious from the foregoing description. Also note that other than vacuum tube amplifiers may be used, such as transistors or magnetic amplifiers.

Accordingly, while I have described above the principles of my invention in connection with specific apparatus, it is to be clearly understood that this description is made only by way of example and not as a limitation to the scope of my invention as set forth in the objects thereof and in the accompanying claims.

I claim:

1. A direction finder comprising means responsive to an incoming signal for generating a wave varying in phase in accordance with the angle between the direction from which the incoming signal arrives and a given reference direction, means for converting said phase-varying wave into alternating current waves of the same fixed phase whose relative amplitudes vary in accordance with said angle, and means responsive to said relative amplitudes for indicating said angle of the incoming signal.

2. A direction finder according to claim 1, wherein said indicating means comprises a motor, means for applying said waves of fixed phase to said motor to vary the angular position of the shaft thereof in accordance with the variations in direction from which incoming signals are being received, a synchro differential generator, means for coupling signals indicative of compass direction to said generator, means for coupling the shaft of said motor to the rotor of said generator, and means responsive to the output of said generator for indicating the true compass direction from which the incoming signals are being received.

3. A direction finder comprising means responsive to an incoming signal for generating a wave varying in phase in accordance with the angle between the direction from which the signal arrives and a reference direction, means for generating a reference wave of the same frequency as said phase-varying wave but fixed in phase, means for converting said phase-varying wave into waves of the same phase as said reference wave but whose relative amplitudes vary in accordance with said angle, and means responsive to said reference wave and said amplitude-varying waves for indicating said angle.

4. A direction finder comprising an antenna system, means coupled to said antenna system to effectively scan in opposite directions a given physical space at a predetermined frequency, means coupled to said scanning means to derive therefrom a pair of waves of said predetermined frequency whose phase varies according to the relative bearing of an incoming signal with respect to a given reference and whose vector representation consists of two oppositely rotating vectors, means for generating a reference wave of said same predetermined frequency but whose phase is fixed with respect to said scanning, means for combining said phase-varying waves to produce signals of fixed phase whose relative amplitudes vary in accordance with the direction of the incoming signal, and means responsive to said reference wave and said signals for producing an indication of the relative bearing of said incoming signal.

5. A sector-scanning direction finder comprising a plurality of directional antennas each generally directed towards a different azimuthal sector, switching means coupled to each of said antennas for cyclically scanning the outputs of said antennas at a predetermined frequency, means coupled to said switching means for generating a reference wave synchronized and fixed in phase with respect to said scanning, means coupled to the output of said switching means for deriving therefrom two waves of the same frequency as said scanning frequency and whose phase varies in accordance with the angle between the direction from which an incoming signal is received by said antennas and a reference direction determined by the phase of said reference wave, the vector representations of said signals having opposite rotations, means for deriving from said two waves at least one signal wave of the same time phase as the reference wave but varying in amplitude as a trigonometric function of the angle between the direction from which said incoming signal is received and said reference direction, means for comparing the amplitude of said reference wave with the amplitude of said signal wave, and means for producing an indication in response to said comparison.

6. A sector-scanning direction finder according to claim 5, wherein said switching means comprises a pair of sector switches both coupled to each of said antennas, and means for driving said switches so that each scans the antennas in opposite directions, said means coupled to the output of said switching means comprising two receivers each coupled to the output of a separate one of said sector switches.

7. A sector-scanning direction finder comprising a plurality of directional antennas each generally directed towards a different azimuthal sector, a sector switch having a movable wiper and whose contacts are connected to different ones of said antennas, means providing a D.-C. path through the sector switch wiper and predetermined ones of said contacts, means for applying a D.-C. potential to said wiper so that upon rotation of said wiper a switching wave is produced, means for deriving gating voltages from said switching wave, means for deriving a reference wave fom said switching wave which is locked in phase with the positions of the switch's wiper arm, a receiver, means coupling the wiper of the switch to said receiver to apply the signals picked up by the antennas thereto, means responsive to said gating voltages and coupled to the output of said receiver for separating the output into two channels, each of said channels containing a wave of the same frequency as said scanning frequency but whose phase varies in accordance with the angle between the direction from which an incoming signal is received by said antennas and a reference direction determined by the phase of said reference wave, means for converting said waves into three signal voltages each of the same phase but varying in amplitude as a trigonometric function of said angle, said angle plus 120 degrees and said angle minus 120 degrees respectively, a synchro motor having three stator coils and a rotor coil mounted on a rotatable shaft, means for applying each of said signal voltages to a different stator coil, means for applying said reference wave to the rotor coil, and means coupled to the shaft for producing a directional indication.

8. A sector-scanning direction finder comprising a plurality of directional antennas each directed towards a different azimuthal sector, switching means coupled to each of said antennas for cyclically scanning the output of said antennas at a predetermined frequency, means coupled to said switching means for generating a reference wave synchronized with and phase locked to the scanning frequency, means coupled to the output of said switching means for deriving therefrom two waves of the same frequency as said scanning frequency and whose phase varies in accordance with the angle between the direction from which an incoming signal is received from said antennas and a given reference direction, the vector representations of said signals being conjugates of each other and having opposite rotations, means for deriving from said two signals a plurality of signal waves of the same time phase as the reference wave but each varying in amplitude as the same trigonometric function of a different angle, the first of said angles being said angle between the direction from which said incoming signal is received and a given reference direction, each angle successively increasing by an amount equal to 360 degrees divided by the number of said signal waves, a synchro motor having a plurality of signal inputs and a reference wave input, means for applying said reference wave to said reference wave input, means for applying said signal waves to the other inputs, and means coupled to said synchro motor for producing a directional indication.

9. A sector-scanning direction finder comprising a plurality of directional antennas each directed towards a different azimuthal sector, switching means coupled to each of said antennas for cyclically scanning the output of said antennas at a predetermined frequency, means coupled to said switching means for generating a reference wave synchronized with and phase locked to the scanning frequency, means coupled to the output of said switching means for deriving therefrom two modulation waves of the same frequency as said scanning frequency and whose phase varies in accordance with the angle between the direction from which an incoming signal is received from said antennas and a given reference direction, the vector representations of said waves being conjugates of each other and having opposite rotations, means for deriving from said two modulation waves three signal waves each of the same time phase but with one signal wave varying in amplitude as a trigonometric function of said angle, the second signal wave varying in amplitude as said function of said angle plus 120 degrees, and the third signal wave varying in amplitude as said function of said angle minus 120 degrees, a synchro motor having three stator coils and a rotor coil mounted on a rotatable shaft, means for applying each of said signal waves to a different stator coil, means for applying said reference wave to the rotor coil, and means coupled to the shaft for producing a directional indication.

10. A direction-finder system having a plurality of directional antennas each directed towards a different sector, a sector switch having its contacts connected to each of said antennas and its wiper arm rotated at a predetermined frequency for cyclically scanning the output of said antennas, an arrangement for deriving a reference wave synchronized with and locked in phase with the angular positions of said switch comprising a D.-C. source, means providing a D.-C. path through the wiper arm and predetermined ones of said contacts to said source whereby upon rotation of said arm a switching voltage wave is produced, a pulse generator, means for applying said switching voltage to synchronize said pulse generator, means for combining the output of said pulse generator and said switching voltages, and means for filtering the results to produce the desired reference wave.

11. A direction-finder system according to claim 10, further including a synchro motor, means for applying said reference wave to said synchro motor, means for deriving from the output of said sector switch a plurality of signal voltages of the same phase whose relative amplitudes vary in accordance with changes in the direction from which the incoming signal is received with respect to the antenna orientation, means for applying said fixed-phase signal voltages to said synchro motor, and means coupled to the shaft of said synchro motor for producing a directional indication.

12. A direction-finder system according to claim 11, in which said means for deriving said voltages of fixed phase comprises a receiver coupled to the output of said sector switch, a pair of channels coupled to the output of said receiver, means for applying said gating voltages to alternatively enable one or the other of said channels so as to produce in each channel a modulation envelope wave of the same frequency as said reference wave but varying in phase in accordance with the angle which the incoming wave makes with a given direction determined by the orientation of the antenna system, means for shifting the phase of said waves in opposite directions by an equal predetermined amount and for combining the shifted wave to produce one of said signal voltages, means for again shifting the phase of said modulation waves by said predetermined amount but in the reverse directions and for combining the results to produce another of said signal voltages, and means for combining two of said signal voltages to produce a third.

References Cited in the file of this patent

UNITED STATES PATENTS

| | | |
|---|---|---|
| 1,839,290 | Bailey | Jan. 5, 1932 |
| 2,209,191 | Dearing | July 23, 1940 |
| 2,308,936 | Schuchardt et al. | Jan. 19, 1943 |